United States Patent
Urata et al.

(10) Patent No.: US 7,628,293 B2
(45) Date of Patent: Dec. 8, 2009

(54) GREASE SUPPLY APPARATUS

(75) Inventors: Masahiko Urata, Yamanashi (JP); Koichi Nishimura, Susono (JP)

(73) Assignee: Fanuc Ltd, Yamanashi (JP)

( * ) Notice: Subject to any disclaimer, the term of this patent is extended or adjusted under 35 U.S.C. 154(b) by 456 days.

(21) Appl. No.: 11/591,502

(22) Filed: Nov. 2, 2006

(65) Prior Publication Data
US 2007/0119860 A1 May 31, 2007

(30) Foreign Application Priority Data
Nov. 25, 2005 (JP) ............................. 2005-340628

(51) Int. Cl.
*B67D 5/08* (2006.01)
(52) U.S. Cl. ...................... 222/58; 222/55; 222/63; 222/66; 184/7.4; 184/105.1
(58) Field of Classification Search ............ 222/55–56, 222/58, 63, 66, 335; 604/65; 141/104–105; 184/7.4, 105.2, 105.1
See application file for complete search history.

(56) References Cited

U.S. PATENT DOCUMENTS

| | | | | |
|---|---|---|---|---|
| 4,778,450 | A | * | 10/1988 | Kamen ..................... 604/65 |
| 4,844,298 | A | * | 7/1989 | Ohoka et al. ............... 222/58 |
| 4,921,132 | A | * | 5/1990 | Wales et al. ................ 222/57 |
| 5,040,699 | A | * | 8/1991 | Gangemi ..................... 222/1 |
| 6,149,037 | A | * | 11/2000 | Berrend .................... 222/326 |
| 6,155,380 | A | * | 12/2000 | Ichikawa et al. ........... 184/5.1 |
| 6,216,822 | B1 | | 4/2001 | May et al. |
| 6,536,683 | B1 | | 3/2003 | Filicicchia et al. |

| | | | | |
|---|---|---|---|---|
| 2002/0187248 | A1 | * | 12/2002 | Childers ..................... 427/2.1 |

FOREIGN PATENT DOCUMENTS

| | | |
|---|---|---|
| CN | 2282605 | 5/1998 |
| DE | 298 18 084 | 3/1999 |
| EP | 0 987 486 | 3/2000 |
| GB | 2 294 734 | 5/1996 |
| JP | 6-39512 | 2/1994 |
| JP | 8094423 | 4/1996 |
| JP | 10148299 | 6/1998 |
| JP | 10148299 A1 * | 6/1998 |
| JP | 2003-83351 | 3/2003 |
| JP | 2003128188 | 5/2003 |

OTHER PUBLICATIONS

Notification of First Office Action from Chinese Patent Office in corresponding Chinese patent application 2006101467897, issued Apr. 18, 2008.
Notice of Reasons for Rejection (Office Action) in corresponding Japanese Patent Application No. 2005-340628, mailed Aug. 14, 2007.
European Search Report in corresponding Patent Application No. 06255424.1-2311 dated Mar. 30, 2007.

* cited by examiner

*Primary Examiner*—Kevin P Shaver
*Assistant Examiner*—Andrew P Bainbridge
(74) *Attorney, Agent, or Firm*—Staas & Halsey LLP

(57) ABSTRACT

An initial weight of a grease storing cartridge attached to a pump is measured, and the measured value is compared with a reference weight and it is determined whether the initial weight of the cartridge is within an appropriate range or not. The weight of the cartridge is measured before and after execution of one operation cycle of the pump, and it is determined whether the difference therebetween (i.e., weight of grease which is actually supplied during one operation cycle) is within an appropriate range or not.

4 Claims, 2 Drawing Sheets

GREASE SUPPLY APPARATUS

BACKGROUND OF THE INVENTION

1. Field of the Invention

The present invention relates to a grease supply apparatus used for supplying grease to a necessary portion of industrial equipment.

2. Description of the Related Art

As is known, in the industrial equipment, it is necessary to supply grease to various kinds of mechanical elements (e.g., gears, bearings and the like), and there is a known grease supply apparatus which automatically supply grease. It is also known that, when lubricant (grease) is supplied to a mold, an amount of grease to be supplied is metered and supplied (e.g., see Japanese Patent Application Laid-open No. 6-39512). There is a known method in which when grease must be supplied to two or more parts, an amount of grease to be supplied to each of such parts is monitored (e.g., see Japanese Patent Application Laid-open No. 2003-83351).

According to these techniques, however, it is impossible to know whether the kind of the grease which is used is appropriate or not at the time of start of use. Especially in case of an apparatus in which a cartridge storing a given amount of grease is attached to a pump, there is no means for determining whether the charged amount of grease into the cartridge is sufficient or not or whether or not the kind and quality of grease stored in the cartridge have abnormality, which causes an operator inconvenience.

SUMMARY OF THE INVENTION

It is an object of the invention to improve a grease supply apparatus of a type in which a cartridge accommodating grease therein is attached to a pump, and to make it possible to find abnormality in an amount of grease stored, and kind and quality of grease stored in high accuracy. Further, the apparatus has a function to check the amount of supply of grease to be supplied by the intermittent action of the pump with a varied weight of remaining grease before and after one operation cycle. With this function, it is possible to know whether there is abnormality in the apparatus during the supply of grease, and to known whether the remaining amount of grease is sufficient or not.

A grease supply apparatus according to the present invention comprises a pump to which a cartridge accommodating grease therein is set. The pump supplies the grease accommodated in the cartridge to a part to which the grease is to be supplied. The grease supply apparatus also comprises a controller which controls output of the pump. The controller operates the pump intermittently and sucks a predetermined volume of grease from the cartridge every operation cycle to supply the grease to a part to which grease is to be supplied.

According to a first aspect of the present invention, a grease supply apparatus comprises a pump to which a cartridge can be attached, and which sucks grease stored in the attached cartridge and supplies the grease to a part to which the grease is to be supplied, weight measuring means which measures weight of the cartridge attached to the pump, reference weight storing means which stores an initial reference weight of the cartridge, determining means which compares weight of the cartridge measured by the weight measuring means with the initial reference weight stored in the reference weight storing means, and determines whether the difference therebetween is within a permissible range or not, and informing means for informing of the determination result of the determining means.

According to a second aspect of the invention, a grease supply apparatus comprising a pump to which a cartridge can be attached, and which sucks grease stored in the attached cartridge and supplies the grease to a part to which the grease is to be supplied, a controller which controls action of the pump, weight measuring means which measures weight of the cartridge attached to the pump, reference weight storing means which stores a grease supply reference weight per one operation cycle of the pump, grease supply amount calculating means which calculates weight of grease which is sucked and supplied from the cartridge when the pump is operated for one operation cycle under control of the controller from the measurement result of the weight measuring means, determining means which compares weight of supplied grease which is calculated by the grease supply amount calculating means with the grease supply reference weight stored in the reference weight storing means, and determines whether the difference therebetween is within a permissible range or not, and informing means for informing of the determination result of the determining means. And the weight of grease which is sucked and supplied during the one operation cycle is obtained from the measurement results of the weight measuring means as measured before and after execution of one cycle operation of the pump.

According to a third aspect of the present invention, a grease supply apparatus comprises a pump to which a cartridge can be attached, and which sucks grease stored in the attached cartridge and supplies the grease to a part to which the grease is to be supplied, a controller which controls action of the pump, weight measuring means which measures weight of the cartridge attached to the pump, reference weight storing means which stores an initial reference weight of the cartridge and a grease supply reference weight per one operation cycle of the pump, grease supply amount calculating means which calculates weight of grease which is supplied from the cartridge when the pump is operated for one operation cycle under control of the controller from the measurement result of the weight measuring means, first determining means which compares weight of the cartridge as measured by the weight measuring means with the initial reference weight of the cartridge stored in the reference weight storing means, and which determines whether the difference therebetween is within a permissible range or not, second determining means which compares the grease supply weight calculated by the grease supply amount calculating means with the grease supply reference weight stored in the reference weight storing means, and which determines whether the difference therebetween is within a permissible range or not, and informing means for informing of the first and second determination results from the first and second determining means. And weight of grease which is supplied during the one operation cycle is obtained from the measurement results of the weight measuring means as measured before and after execution of one operation cycle of the pump.

The grease supply apparatus according to the second and third aspect of the present invention can employ the following configurations.

When the determining means determines that the difference between the supplied weight of grease and the initial reference weight is not within the permissible range, the determining means may command the controller to stop execution of next one operation cycle of the pump.

The controller may include input means for inputting, from a machine having a part to which the grease is to be supplied, information informing of the fact that the operation time of the machine reaches a given time, and the controller may receive, through the input means, information that the operation time of the machine reaches the given time. When the determining means determines that the difference between the supplied weight of grease and the initial reference weight is within the permissible range, the controller may permit actuation of the pump.

A cartridge attaching member may be fixed to the pump. A weight sensor may be attached to a bottom of the cartridge attaching portion, The weight sensor may constitute the weight measuring means. If the cartridge is placed on the cartridge attaching member, the entire weight of the cartridge is applied to the weight sensor, in a state where the cartridge is placed on the cartridge attaching portion, a suction tube extending from the pump is connected to a draft port formed near the bottom of the cartridge, and the entire weight of the suction tube is supported by one end of the suction tube on the side of the pump so that a force which is caused by the suction tube and acts on the cartridge is so small that the force is negligible.

Since the grease supply apparatus according to the invention has the above-described configurations, it is possible to know abnormality in an amount of grease stored in the cartridge attached to the pump for supplying grease, kinds and quality of grease and the like in high accuracy. Therefore, it is possible to avoid troubles caused when an operator tries to use a cartridge in which a different kind of grease is erroneously filled, or when an operator tries to use a cartridge having insufficient grease (e.g., spent cartridge), or when a cartridge is a defective (amount of grease filled is insufficient or specific gravity is abnormal). It is also possible to know abnormality of the apparatus or shortage of remaining grease in process of grease supplying by checking variation in weight of remaining grease before and after each operation cycle, which enhance convenience of supply of grease using a cartridge.

DETAILED DESCRIPTION OF THE PREFERRED EMBODIMENTS

Figure 1:
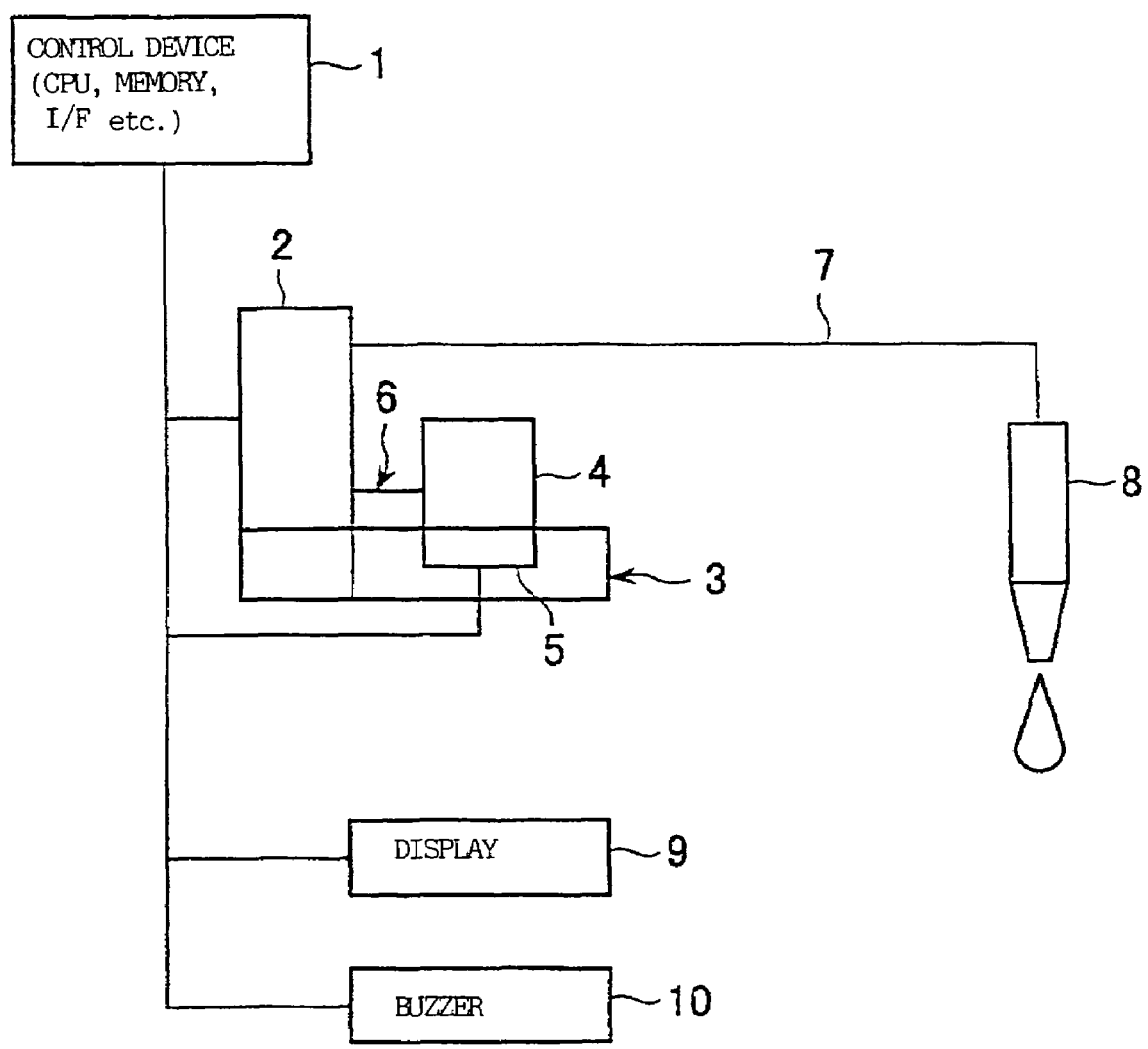
FIG. 1 is a block diagram of an embodiment of a grease supply apparatus according to the present invention.

FIG. 1 is a block diagram of an embodiment of a grease supply apparatus according to the present invention. The grease supply apparatus includes a controller 1. The controller 1 includes a CPU, a memory, various interfaces (I/F) and the like. A personal computer, a numerical controller or the like can be used as the controller 1. A pump 2, a display device 9, a buzzer 10, manual operating members (a keyboard, a control panel, a mouse and the like) are connected to the controller 1, and these members constitute the grease supply apparatus.

A cartridge attaching portion 3 is attached to the pump 2. A cartridge 4 having predetermined size and structure can be attached to the cartridge attaching portion 3. Grease to be supplied to machine elements (not shown) is stored in the cartridge 4. A weight sensor 5 is provided in a lower portion of the cartridge attaching portion 3, the cartridge 4 is disposed on the weight sensor 5, and the weight of the entire cartridge 4 is applied to the weight sensor 5.

A suction tube 6 for sucking grease from the cartridge 4 is connected to the pump 2. A tip end of the suction tube 6 is connected to a draft port provided near a bottom of the cartridge 4 mounted on the cartridge attaching portion 3. The entire weight of the suction tube 6 is supported by one end (base end) on the side of the pump 2. Therefore, even when the other end (tip end) of the suction tube 6 is connected to the draft port of the cartridge 4, a force which is caused by the suction tube 6 and acts on the cartridge is so small that the force is negligible.

The pump 2 itself is of well-known type, and its actions are controlled in accordance with a command from the controller 1. Controls of the actions of the pump 2 include start-up and stoppage of the pump and control of the supply capacity (suction/discharge performance) at the time of action. Grease sucked into the pump 2 from the cartridge 4 through the suction tube 6 is sent to a grease supply nozzle 8 located near a part to which grease is to be supplied through a supply pipe 7 from the pump 2. Grease in the grease supply nozzle 8 drops toward the part to which the grease is to be supplied.

When there are two or more parts to which the grease is to be supplied, the grease supply nozzle 8 is disposed for each of the parts to which the grease is to be supplied, and the grease is sent to each grease supply nozzles 8 from the pump 2 using branch pipes, and grease drops from each grease supply nozzle 8 to the corresponding part to which the grease is to be supplied.

In a normal operation mode, the pump 2 is operated intermittently, and a predetermined volume of grease is sucked from the cartridge 4 every operation cycle, and the grease is sent to the supply pipe 7. To carry out the normal operation mode automatically, in this embodiment, transition patterns of output (supplied electricity) of the pump 2 from the start-up to the stoppage in each motion cycle are stored beforehand in the memory of the controller 1. Whenever a pump start-up signal is output, the controller executes a motion cycle in accordance with the transition pattern. In this case, the pump start-up signal is input to the controller 1 whenever an operation amount (operation time, the number of operations or the like) of a machine (not shown) having a grease supply part reaches a given amount.

In addition to the normal operation mode, the grease supply apparatus may have a mode capable of forcibly carrying out one cycle action manually. The grease supply apparatus also can have a mode for outputting a pump start-up signal periodically (e.g., every 48 hours) using a timer, irrespective of the operation amount of the machine. As will be explained later, the actuation of the pump 2 is permitted or prohibited depending whether a flag F1 set in the controller 1 is set (F=1) or reset (F=0).

Figure 2:
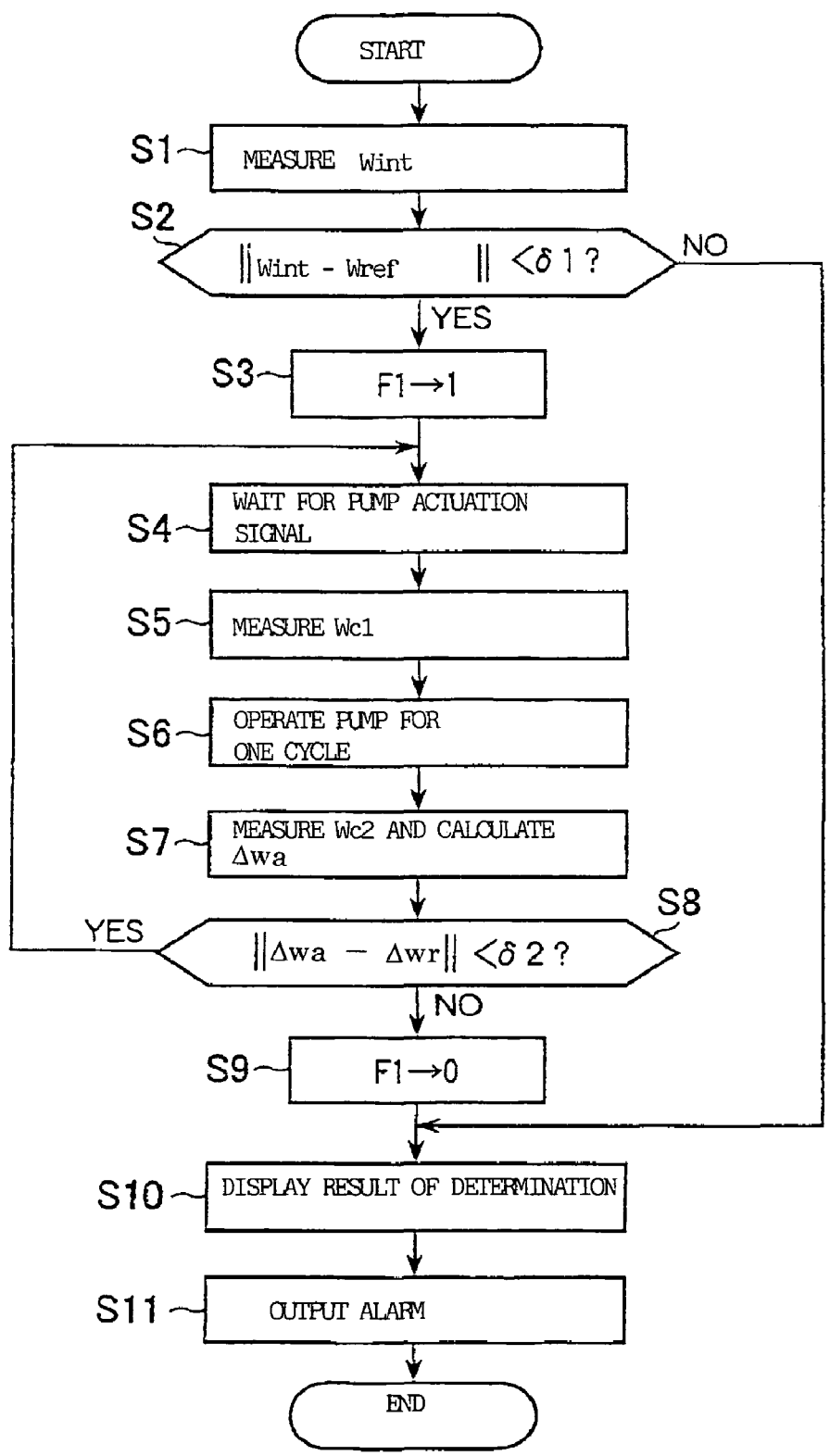
FIG. 2 is a flowchart of outline of processing which is executed in a controller of the grease supply apparatus shown in FIG. 1.

According to the embodiment, the grease supply apparatus shown in FIG. 1 executes the processing shown in FIG. 2 under the control of the controller 1. This processing is started when an operator manually inputs a command representing "completion of setting of cartridge" in a state where the cartridge 4 is attached to the cartridge attaching portion 3 and a tip end of the suction tube 6 connected to the pump 2 is connected to the suction port of the cartridge 4. A program, parameters, an initial value of the flag F1 (F1=0) for the processing are stored in the memory of the controller 1. Those parameters stored in the memory includes data sets concerning "cartridge reference weight Wref" indicating an appropriate initial weight of the cartridge 4 and its permissible deviation $\delta 1$, "grease supply reference weight $\Delta W$" indicating an appropriate grease supply weight of one operation cycle and its permissible deviation $\delta 2$.

Essential points of the steps in this processing are as follows:

step S1; an initial weight Wint of the cartridge 4 in which grease is stored is measured using output of the weight sensor 5.

step S2; the measured initial weight Wint is compared with the cartridge reference weight Wref stored in the memory and it is determined whether or not a difference therebetween is within the permissible deviation δ1. If determined that the difference is within the permissible deviation δ1 (or determined appropriate), the process proceeds step S3. On the other hand, if determined that the difference exceeds the permissible deviation δ1 (or determined not appropriate), the process proceeds to step S10.

step S3; the flag F1 (which is reset (F1=0) at the initial state) is set to 1 (F1=1). With this, the pump is brought into a state where the pump can be actuated.

step S4; the controller waits for output of the pump start-up signal. The output timing of the pump start-up signal is as described above.

step S5; if the pump start-up signal is output, the weight Wc1 of the cartridge 4 in which grease is stored immediately before the operation cycle is started is measured using the output of the weight sensor 5.

step S6; the pump 2 is actuated, and operation for one operation cycle is carried out in accordance with the transition pattern as described above. With this, a predetermined volume (with an error included in some cases) of grease is sucked from the cartridge 4, and is sent out into the supply pipe 7, and a batch of grease is supplied to a machine element (part to which the grease is to be supplied) from the grease supply nozzle 8.

step S7; the weight Wc2 immediately after the current operation cycle is completed is measured using the weight sensor 5. A reduced amount Δwa of grease in the cartridge 4 (i.e., weight of grease supplied during the current one cycle) is measured from a difference between the weight Wc2 immediately after the current operation cycle is completed and the weight Wc2 immediately before the current operation cycle is started (measured in step S5) (Δwa=Wc1-Wc2).

step S8; the reduced weight of grease Δwa obtained in step S7 is compared with the grease reference supply amount Δwr stored in the memory, and it is determined whether or not the absolute value of a difference therebetween is within the permissible deviation δ2. If determined that the absolute value of the difference is within the permissible deviation δ2 (or determined appropriate), the process returns to step S4, waiting for output of the pump start-up signal. If determined that, on the other hand, the absolute value exceeds the permissible deviation δ2 (or determined not appropriate), the process proceeds to step S9, prohibiting actuation of the pump 2.

step S9; the flag F1 (which is set to 1 (F1=1) in step S3) is reset (F=0). With this, the actuation of the pump is prohibited.

step S10; the result of the determination made in step S2 and the result of the determination made in step 8 are displayed on the screen of the display device 9. The result of the determination made in step S2 includes the difference between the initial weight Wint of the mounted cartridge 4 and its reference weight Wref, the absolute value of that difference and the preset permissible deviation δ1, and a matter as to whether or not that difference is within the preset permissible range. The result of the determination made in step 8 includes the difference between the amount of grease Δwa reduced by execution of one cycle motion and the reference supply weight Δwr, the difference between the absolute value of that difference and the permissible deviation δ2, and a matter as to whether or not that difference is within the preset permissible range).

step S11; when determined that, as a result of determination of step S2, the value of the initial weight Wint is out of the permissible range, or when determined that, as a result of determination of step S8, the amount of grease Δwa reduced by execution of one cycle motion is out of the permissible range, a buzzer 10 (alarm) is sounded to give warning an operator to that effect, and the grease supply processing is completed.

As explained above, shortage of the grease storage amount (volume) in the cartridge and abnormality (abnormality of kind and quality) of specific gravity of grease stored in the cartridge are found in high accuracy immediately after the cartridge is set, and an operator is informed of such shortage or abnormality. Also, when smoothly intermittent supply of grease becomes difficult due to abnormality of the pump, abnormality of the pipe, damage of the cartridge, leakage, absence of grease and the like, such abnormality is immediately detected so that an operator is informed of the abnormality.

The invention claimed is:

1. A grease supply apparatus comprising a pump to which a cartridge can be attached, and which sucks grease stored in the attached cartridge and supplies the grease to a part to which the grease is to be supplied, a controller which controls action of the pump, weight measuring means which measures a weight of the cartridge attached to the pump to thereby generate a weight measurement result, reference weight storing means which stores an initial reference weight of the cartridge and a grease supply reference weight per one operation cycle of the pump, grease supply amount calculating means which calculates weight of grease which is supplied from the cartridge when the pump is operated for one operation cycle under control of the controller from the weight measurement result of the weight measuring means, first determining means which compares the weight of the cartridge as measured by the weight measuring means with the initial reference weight of the cartridge stored in the reference weight storing means, and which determines whether the difference therebetween is within a permissible range or not, second determining means which compares the grease supply weight calculated by the grease supply amount calculating means with the grease supply reference weight stored in the reference weight storing means, and which determines whether the difference therebetween is within a permissible range or not, and informing means for informing of the first and second determination results from said first and second determining means, wherein weight of grease which is supplied during the one operation cycle is obtained from the weight measurement result of the weight measuring means as measured before and after execution of one operation cycle of the pump.

2. The grease supply apparatus according to claim 1, wherein when the determining means determines that the difference between the supplied weight of grease and the initial reference weight is not within the permissible range, the determining means commands the controller to stop execution of next one operation cycle of the pump.

3. The grease supply apparatus according to claim 1, wherein the controller includes input means for inputting, from a machine having a part to which the grease is to be supplied, information informing that the operation time of the machine reaches a given time, the controller receives, through the input means, information that the operation time of the machine reaches the given time, and when the determining means determines that the difference between the supplied weight of grease and the grease supply reference weight is within the permissible range, the controller permits actuation of the pump.

4. The grease supply apparatus according to claim 1, wherein a cartridge attaching member is fixed to the pump, a weight sensor is attached to a bottom of the cartridge attaching portion, the weight sensor constitutes the weight measuring means, and if the cartridge is placed on the cartridge attaching member, the entire weight of the cartridge is applied to the weight sensor, in a state where the cartridge is placed on the cartridge attaching portion, a suction tube extending from the pump is connected to a draft port formed near the bottom of the cartridge, the entire weight of the suction tube is supported by one end of the suction tube on the side of the pump so that a force which is caused by the suction tube and acts on the cartridge is so small that the force is negligible.

* * * * *

UNITED STATES PATENT AND TRADEMARK OFFICE
CERTIFICATE OF CORRECTION

PATENT NO. : 7,628,293 B2 Page 1 of 1
APPLICATION NO. : 11/591502
DATED : December 8, 2009
INVENTOR(S) : Masahiko Urata et al.

It is certified that error appears in the above-identified patent and that said Letters Patent is hereby corrected as shown below:

Column 5, Line 49, change "62" to --$\delta 2$--.

Column 5, Line 65, change "61," to --$\delta 1$,--.

Signed and Sealed this

Ninth Day of March, 2010

David J. Kappos
*Director of the United States Patent and Trademark Office*